United States Patent [19]
Matz et al.

[11] Patent Number: 6,100,335
[45] Date of Patent: Aug. 8, 2000

[54] COMPOSITIONS BASED ON PROPYLENE POLYMER AND ETHYLENE-VINYL ACETATE COPOLYMER, PROCESS FOR THEIR CONVERSION, SHEETS OBTAINED FROM THESE COMPOSITIONS

[75] Inventors: Pierre Matz, Ohain; Edmond Mulkens, Braine-L'Alleud, both of Belgium

[73] Assignee: Solvay (Société Anonyme), Brussels, Belgium

[21] Appl. No.: 08/578,146

[22] Filed: Dec. 27, 1995

[30] Foreign Application Priority Data

Dec. 27, 1994 [BE] Belgium ............... 09401179

[51] Int. Cl.⁷ ............ C08L 23/12; C08L 23/16; C08K 5/14
[52] U.S. Cl. ............ 525/194; 525/222; 525/240
[58] Field of Search ............... 525/222, 227, 525/194, 240

[56] References Cited

U.S. PATENT DOCUMENTS 3,433,573  3/1969  Holladay et al. ............... 8/497
5,274,035  12/1993  Chundury ............... 525/92
5,571,585  11/1996  Yoshida et al. ............... 428/36.91

FOREIGN PATENT DOCUMENTS 0013084   7/1980   European Pat. Off. .
0210306   2/1987   European Pat. Off. .
93/13170  7/1993   WIPO .
93/24568  12/1993  WIPO .

*Primary Examiner*—Jeffrey C. Mullis
*Attorney, Agent, or Firm*—Venable; George H. Spencer; John W. Schneller

[57] ABSTRACT

Compositions based on propylene polymer, ethylene-vinyl acetate copolymer and organic peroxide, characterized in that they include, by weight:

a) 10 to 49% of at least one propylene polymer;
b) 90 to 51% of at least one ethylene-vinyl acetate copolymer in which the vinyl acetate content is from 12 to 40% by weight;
c) between 50 and 1000 ppm (parts per million) of at least one organic peroxide. The sheets obtained by extrusion of these compositions can be employed for the internal trim in the motor vehicle industry.

19 Claims, No Drawings

COMPOSITIONS BASED ON PROPYLENE POLYMER AND ETHYLENE-VINYL ACETATE COPOLYMER, PROCESS FOR THEIR CONVERSION, SHEETS OBTAINED FROM THESE COMPOSITIONS

FIELD OF THE INVENTION

The present invention relates to polymeric compositions based on propylene polymer (PP) and on ethylene-vinyl acetate copolymer (EVA) and additionally containing at least one organic peroxide.

These compositions can be converted by reactive extrusion and result in products exhibiting remarkable properties enabling them to be used specially for the manufacture of internal trim sheets intended for the motor vehicle industry.

The invention also relates to a process for converting the compositions according to the invention in order to obtain thermoformable and high-frequency weldable sheets.

TECHNOLOGICAL BACKGROUND

For many years the market of the internal trim of motor vehicles has been dominated by the use of PVC sheets, either in combination with ABS for the dash-boards, or highly plasticized for the door trim and the manufacture of sun visors.

Although the properties of these materials are advantageous, there are nevertheless some disadvantages in employing PVC in this application. Besides those related to the use of plasticizer, such as fogging (evaporation of volatile constituents, in particular plasticizers, and their deposition on the window glasses) or embrittlement with time, PVC is not compatible with the majority of the other polymers employed in the motor vehicle industry, and this makes it necessary to separate it from other motor vehicle components before its possible recycling.

In the motor vehicle trim there is therefore a demand for a new material combining the good intrinsic properties of plasticized PVC (resistance to high and low temperatures, thermoformability, high-frequency weld-ability and flexibility) with the possibility of being easily recycled, especially by direct thermal recycling, or by reemploying it with other polymers employed in the motor vehicle.

The proposed compositions should not only provide the products resulting therefrom with excellent mechanical and stability properties, but should also be high-frequency weldable, with a view to being usable in the envisaged application. In addition, it is appropriate that the rheology of the compositions employed should be such as to permit thermoforming—and in particular graining—of high quality.

Various compositions based on polyolefins, in particular on a propylene homopolymer or copolymer, on ethylene-vinyl acetate copolymer and optionally on peroxide used as crosslinking agent during the conversion have already been proposed.

Thus, document U.S. Pat. No. 3,433,573 describes a mixture containing an olefin homopolymer and an ethylene-vinyl acetate copolymer, to which an organic peroxide may be added in an unspecified quantity before the mixing or during the latter (column 7, lines 48 to 60).

This mixture may be cured by means of an organic peroxide in a Banbury mixer, an extruder or a kneader, especially for forming sheets.

Document WO-93/24568 mentions compositions making it possible to obtain, especially by extrusion, products that can be high-frequency welded for various applications in the medical field, such as pouches, bags, tubes and closures.

The polymeric composition which is used contains at least one ethylene-vinyl acetate copolymer, at least one propylene homopolymer or copolymer, approximately 0.01% to 5% by weight of a crosslinking agent and approximately 0.1% to 35% by weight of one or a number of other polymers.

SUMMARY OF THE INVENTION

The invention is aimed at providing high-frequency weldable compositions capable especially of replacing PVC in the motor vehicle trim applications without entailing prohibitive costs.

These compositions must meet the criteria which are usual in this field of application, especially with regard to the grainability, the resistance to heat and to UV, mattness and fire resistance, while being recyclable. In particular, they must be thermoformable and must exhibit a suitable rheology for this purpose.

DETAILED DESCRIPTION OF THE INVENTION

The objectives described above may be attained by the use of a very small quantity of peroxide in combination with determined relative proportions between the polymeric fraction consisting of propylene polymer and that consisting of ethylene-vinyl acetate copolymer, the vinyl acetate content of which is furthermore also fixed.

Consequently the invention relates to compositions based on propylene polymer, ethylene-vinyl acetate copolymer and organic peroxide, which are characterized in that they include, by weight:

a) at least 10%, preferably at least 20% of at least one propylene polymer the quantity of which is not more than 49%, preferably not more than 40%;

b) at least 51%, preferably at least 60% of at least one ethylene-vinyl acetate copolymer the quantity of which is not more than 90%, preferably not more than 80%, and the vinyl acetate content of which (in relation to constituent b) is at least 12% by weight, preferably at least 18%, while being not more than 40% by weight, preferably not more than 32%;

c) more than 50 ppm (parts per million), preferably more than 100 ppm, of at least one organic peroxide, the quantity of which is less than 1000 ppm, preferably less than 500 ppm, particularly preferably less than 200 ppm.

The contents of the constituents a, b and c are expressed by weight relative to 100% of the constituents a and b.

Moreover, it is advantageous that the total vinyl acetate content of the compositions should be at least 10%, preferably at least 15%, and not more than 25%, preferably not more than 22%, relative to the total weight of the constituents a and b.

The constituent a) may be especially a random and/or block alpha-olefin homopolymer, copolymer or terpolymer or else a mixture of such polymers. It may additionally contain other comonomers. It preferably contains at least 75% by weight of propylene. Its melt flow index (MFI) (230° C.; 2.16 kg; measured according to ISO standard 1133—1991 version) is advantageously lower than 10 g/10 min and preferably lower than 4 g/10 min. Moreover, it is advantageously at least 0.1 g/10 min, preferably at least 0.4 g/10 min.

An MFI value (190° C.; 2.16 kg; also measured according to ISO standard 1133) which is higher than 0.5 g/10 min, and very particularly higher than 1.5 g/10 min, is preferred in the case of the constituent b). This value is advantageously lower than 25 g/10 min, preferably lower than 9 g/10 min.

According to an advantageous alternative form of the invention the melt indices $MFI_a$ and $MFI_b$ of the constituents a and b (measured in the abovementioned respective conditions and expressed in g/10 min) correspond to the relationship $$\frac{MFI_a \times W_a}{MFI_b \times W_b} < 1, \text{ preferably } \frac{MFI_a \times W_a}{MFI_b \times W_b} < 0.7$$

in which $W_a$ and $W_b$ denote the respective weight proportions of the constituents a and b ($W_a+W_b=1$).

The decomposition temperature ("scorch temperature") of the constituent c is preferably higher than the melting temperature of the constituent b based on ethylene-vinyl acetate polymer. The concentration of the constituent c is based on a percentage of active oxygen of 10% by weight. For other concentrations a rule of three will be applied.

The organic peroxide is preferably chosen from 2,5-dimethyl-2,5-di(tert-butylperoxy)hexane (DHBP), dicumyl peroxide (DCUP), tert-butyl cumyl peroxide (BCUP), di-tert-butyl peroxide (DTBP), 2,5-dimethyl-2,5-di (tert-butylperoxy)-3-hexyne (DYBP) and 1,3-di(2-tert-butylperoxyixopropyl) benzene (DIPP).

The quantity of constituent c which is indicated refers to the assumption that it is completely used up as crosslinking agent during the active extrusion.

If the resins employed contain additives which decrease the effect of the peroxide, such as anti-oxidants, or if the operating conditions are such that the peroxide cannot react completely, in particular when the residence time in the extruder is shorter than the time needed for the reaction, the said quantities of constituent c will have to be adjusted for the active content of peroxide to be sufficient. It is preferable to refrain from adding antioxidants to the constituents employed.

Besides the constituents a, b and c, the compositions of the invention may optionally contain one or a number of known additives and/or fillers which do not entail an increase of more than 25% in the weight or in the volume of the formulation (relative to the sum of the constituents a and b). Examples of additives which may be mentioned are flame retardants, anti-UV agents, lubricants and pigments. Examples of fillers which may be mentioned are calcium carbonate, barium sulphate, fibres of cellulose-based materials, glass fibres and the like.

The compositions thus defined make it possible to obtain all the properties required with a view to the abovementioned applications, this including flexibility, easy thermoformability, high-frequency weldability, fire resistance and excellent properties at high and low temperatures. The composition of the invention can be easily recycled because it is much more compatible with the other polymers generally employed in the motor vehicle industry.

The constituent c) may be added to the constituents a and b as it is or may be introduced into them in the form of a master mixture consisting of this constituent and of a compatible carrier. The same applies to the optional additives and/or fillers. In particular, the constituent c may be introduced on a carrier consisting essentially of polyethylene. The optional carrier for the constituent c preferably does not represent more than 5% of the total weight of the constituents a and b.

The invention also relates to a process for conversion of a composition as described above, which is characterized in that it includes a stage of reactive extrusion of the composition. The reactive extrusion is preferably performed in an extruder fitted with a slot die, and this makes it possible to obtain a sheet directly from the constituents of the mixture. Good results have been obtained by avoiding producing a premix of the constituents of the composition (compounding), that is to say by performing the conversion in a single stage.

The sheet obtained may be advantageously grained, colaminated or lacquered in line after its extrusion, but it may also still be subjected to treatments of this type subsequent to its production.

In the operating conditions of the reactive extrusion for compositions of this type it would appear—without this interpretation being capable of constituting a limitation—that the macroradicals of the two polymers (EVA-PP) may react together. EVA-PP copolymers with long branching would then be formed. Polymers of this type are ideal for compatibilizing two incompatible polymers. Moreover, EVA branching on other EVAs and a depolymerization of the PP would be produced.

The formation of long branching is highly advantageous for the applications in which the sheet must be thermoformed. This branching entails an improvement in the viscoelastic properties at a low velocity gradient (melt strength and thermoformability) without increasing the viscosity at high gradient, as would have happened with a polymer or a mixture of polymers of linear structure of higher molecular weight. The extrudability is thus ensured. Besides the property of high melt strength, this branching produces some structural hardening (strain hardening) due to the entanglements formed between the macromolecules. This property enables the thickness to be kept uniform when a sheet is thermoformed, thereby avoiding obtaining regions which are significantly more drawn out than others.

The large increase in the viscosity at a low extrusion gradient is also advantageous because it produces microirregularities at the surface of the extruded sheet and therefore gives it a matt appearance and a dry feel.

The invention also relates to the high-frequency weldable sheets obtained from a conversion in accordance with the invention as described above. In addition, it extends to the multilayer structures in which at least one layer is a sheet as described above. An advantageous benefit of the invention is that the matt sheets in accordance with the invention retain substantially their mattness after a thermoforming operation, in contrast to the known sheets, in which regions that are highly deformed during a thermoforming operation become relatively smooth and glossy, which gives the whole sheet an unacceptable heterogeneous appearance.

It also relates to the use of these sheets for the internal trim in the motor vehicle industry. Finally, it relates to the use of the sheets produced according to the process of the invention for the internal trim in the motor vehicle industry.

Elsewhere, the compositions of the invention find a particularly advantageous application in the compatibilizing of mixtures of EVA and of one or a number of other polymers (such as especially propylene polymers) which are free from peroxide; by adding a small quantity of a composition in accordance with the invention to such mixtures it is possible to improve greatly the compatibility of the EVA and of the other polymer(s) in the said mixture.

Finally, the invention relates to sheets including, by weight, 10 to 49% of at least one propylene polymer and 90 to 51% of at least one ethylene-vinyl acetate copolymer in which the vinyl acetate content is at least 12 and not more than 40% by weight, which are characterized both by a $\mu_{0.25}/\mu_{100}$ (these parameters denoting the shear viscosity, measured with a rheogoniometer, at 170° C., at 0.25 s$^{-1}$ and 100 s$^{-1}$ respectively) ratio higher than 25 and by a $\mu_{maxF}/\mu_{0.2s}$ (these parameters denoting the elongational viscosity at which the tensile force exerted on the sample is at a maximum, and that measured after 0.2 s of traction, both being at 170° C.) ratio higher than 5.

DETAILED DESCRIPTION OF EMBODIMENTS OF THE INVENTION

The invention will be described in greater detail with reference to nonlimiting examples of embodiment (Examples 1, 2, 5 and 6) with a view to obtaining a sheet intended for the motor vehicle trim, corresponding to the criteria which are usual in the specifications in this sector.

Examples 3R, 4R and 7R are comparative examples which do not correspond to the conditions of the invention and result in products which do not meet all these criteria.

EXAMPLE 1

The composition is obtained by kneading, at high temperature, in an extruder, a mixture containing:

1) 30% of Solvay Eltex® P HL011 PP, in fluff form;
2) 70% of Exxon Escorene® UL00328 EVA in granule form;
3) 1 phr of a master mix of Peroxyde Chemie DHBP peroxide adsorbed on a polyethylene (PE) fluff, corresponding to 500 ppm of peroxide.

To facilitate the accurate and continuous incorporation of the liquid peroxide, the latter was diluted and adsorbed on a PE powder by means of a fast mixer of the Papenmeyer type.

These three products 1), 2) and 3) were poured via separate metering devices into the feed hopper of the compounding extruder, which in this case is a Clextral BC 21 twin-screw extruder. To ensure steady metering, the screw must remain uncovered in the feed zone. In addition, 2 phr of carbon black were incorporated into this composition.

The screw profile includes two pressure mixing zones, each followed by a zone of intense kneading. The last kneading zone is followed by a decompression zone provided with a degassing vent for extracting the volatile decomposition residues.

The stock is then pressurized again to enable it to pass through a die with holes. The lace(s) thus formed are then cut into granule form. The temperature profile employed is the following (in °C.):

| Z1 | Z2 | Z3 | Z4 | Z5 | Z6 | Z7 | Z8 |
|----|----|----|----|----|----|----|----|
| 50 | 170 | 180 | 200 | 210 | 220 | 220 | 220, | where zone Z1 corresponds to the feed and zones Z7 and Z8 to the die.

The extruder speed is set at 300 rev/min, the total throughput is 10 kg/h, the mean residence time in the extruder, measured by means of coloured granules, is approximately 25 8 with this profile and screw speed. The specific energy consumption is 0.204 kWh/kg.

The compound produced in granule form is next extruded in sheet form by means of a single-screw extruder fitted with a slot die, onto a roll of the chill roll type. The temperature of the rolls is kept between 50 and 60° C.

The screw has a profile which is suitable for polyolefins. Its length is 25 D (D denoting its diameter) with a compression ratio of 2.6.

EXAMPLE 2

The stages of compounding and of extrusion with a slot die were combined into a single stage. In this example the lace die of the compounding extruder was replaced with a slot die, the parameters of Example 1 being complied with.

The sheets obtained from this formulation, whether in two stages (Ex. 1) or in a single stage (Ex. 2) make it possible to reach a good compromise between the various properties which are necessary for the motor vehicle trim.

EXAMPLE 3R

The procedure is as in Example 1, but in the absence of peroxide. In these conditions it is not possible to obtain sheets which are drawn uniformly during the thermoforming (strain hardening property). These sheets have a glossy appearance and a greasy feel, which makes them unattractive and unsuitable for an application for motor vehicle internal lining.

EXAMPLE 4R

By proceeding as in Example 1 but nevertheless employing 3000 ppm of DHBP, a deterioration in the properties is observed, which is such that it is difficult to extrude the product in sheet form.

Moreover, the sheets eventually produced tear during the thermoforming and exhibit gel formation, so that it is impossible to employ them for the intended application.

EXAMPLE 5

The use of a propylene block copolymer also makes it possible to obtain compounds which are suitable for the envisaged application, provided that the formulation fulfils the characteristics of the invention.

The following composition was processed in the conditions of Example 1:

1) 30% of the Solvay Eltex P RL001 block copolymer;
2) 70% of Exxon Escorene UL00328 EVA;
3) 450 ppm of DHBP adsorbed at a concentration of 5% on LLDPE fluff.

EXAMPLE 6

Similarly, a polypropylene obtained according to the Himont Catalloy® process is suitable. The following composition was processed by following the conditions of Example 1:

1) 40% of the Himont Catalloy Hifax® CA10A PP polymer;
2) 60% of Exxon Escorene UL00328 EVA,
3) 450 ppm of DHBP adsorbed at a concentration of 5% on LLDPE fluff.

EXAMPLE 7R

If incorporation of the necessary quantity of peroxide is omitted, the properties of the sheet obtained from this mixture are not suitable for the application in motor vehicle internal trim.

This comparative example was produced on the basis of the following composition:

1) 40% of the Himont Catalloy Hifax CA10A PP polymer;
2) 60% of Exxon Escorene UL00328 EVA.

The properties of the products from these various examples appear in Table I.

The evaluation techniques employed are the following:

Shear Viscosity

The shear viscosity and the elasticity and viscous moduli are evaluated on an R.D.S. rheogoniometer of Rheometrics trademark, in which the sample is placed between two flat discs and subjected to shear deformations of low amplitude at a temperature of 170° C.

The ratio of the viscosity at low gradient (0.25 s$^{-1}$) to the viscosity at high gradient (100 s$^{-1}$) enables the relative melt strength of the polymer to be quantified. The higher this ratio, the better will be the melt strength of the material. This melt strength is necessary to avoid sagging of the sheet when it is heated before being thermoformed.

Elongational Viscosity

The elongational viscosity is evaluated using a Rheometrics R.E.R. elongational viscometer which makes it possible to evaluate the tensile behaviour of the molten polymers. The sample is placed between two clamps, one stationary, the other movable, and is then immersed into an oil bath controlled at the desired temperature of measurement (in this case 170° C.).

The upper clamp, integrally attached to a draw bar driven by a motor, applies to the upper end of the specimen a displacement (1) changing with time (t) according to the relationship $1=l_0 x e^{Hxt}$, in which $l_0$ denotes the initial length of the specimen, the rate of elongation H (Hencky strain rate) being fixed at 1 s$^{-1}$ To obtain a sheet whose drawing is uniform during the thermoforming, it must exhibit structural hardening (strain hardening) when it is drawn. The strain hardening is characterized by a large increase in the viscosity of the polymer when the latter is drawn in length. It can be quantified by comparing the viscosity obtained at the maximum of the drawing force with the initial elongational viscosity of the polymer. It was measured after a very short time (0.2 s) of drawing of the sample.

Appearance

Two characteristics which are important for the application are, on the one hand, the mattness and, on the other hand, a dry feel of the sheet.

The first characteristic can be measured as the gloss of the sheet. The lower this value is, the better is the sheet.

The evaluation of feel is a subjective comparison of various sheets.

Mechanical Properties

The mechanical properties are measured by a tensile test on an instrument of the Instron® trademark. The sample has a length of 50 mm and the pulling speed applied is 100 mm/min. The modulus is taken between 1 and 2% elongation.

Fire Resistance

The flame resistance is evaluated according to the standard MVSS302 (ISO 3795—version of 15.10.1989). The rate of propagation of the flame is measured after the fire has been pushed out to the sheet to be tested. The manufacturers' recommendation demands a rate of propagation which is lower than 100 mm/min.

High-Frequency Weldability

This is evaluated by a tensile test similar to that performed for measuring the mechanical properties. The weldability criterion employed requires the stress to be higher than 50% of the stress at break, measured on a sample of the same size. Welding is performed during periods from 2 to 10 seconds on a Colpitt machine of 3 kW power.

The results repeated in Table I for the compositions in accordance with the invention make it possible to conclude that the sheets produced from the latter exhibit all the qualities generally required of the sheets of plasticized PVC without having their above-mentioned disadvantages.

In addition, the price of these formulations is lower than that of the comparable commercial formulations based on EPDM and PP or EPR and PP, while permitting high-frequency welding.

These sheets are suitable especially for the door trims and for the sun visors, as well as for other parts of the motor vehicle internal trim.

The following abbreviations are employed in the table which follows:

| | |
|---|---|
| $\mu_{0.25}$ | shear viscosity measured with a Rheometrics R.D.S. rheogoniometer) at 0.25 s$^{-1}$; |
| $\mu_{100}$ | ditto at 100 s$^{-1}$; |
| $\mu_{maxF}$ | elongational viscosity (measured on a Rheometrics R.E.R. elongational viscometer) at which the tensile force exerted on the sample is at a maximum; |
| $\mu_{0.2s}$ | ditto after 0.2 s of traction; |
| $\sigma_R/2$ | half of the stress at break. |

| Properties | Method of demonstration | Characterization | Quality criterion | Examples |||||||
|---|---|---|---|---|---|---|---|---|---|---|
| | | | | 1 | 2 | 3R | 4R | 5 | 6 | 7R |
| Thermoformability | | | | | | | | | | |
| absence of sagging | R.D.S. 170° C. | $\mu_{0.25}/\mu_{100}$ | >25 | 43 | 41 | 21 | 130 | 71 | 34 | 14 |
| good thickness distribution | R.E.R. 170° C. | $\mu_{maxF}/\mu_{0.2s}$ | >5 | 10.6 | 16 | 3.7 | 2.6 | 10.1 | 13.3 | 3 |
| Appearance | | | | | | | | | | |
| mattness | gloss | | | good | good | glossy | good | good | good | glossy |
| dry feel | | | | good | good | greasy | good | good | good | greasy |
| fisheyes | visual | | | good | good | good | many | good | good | good |

| Properties | Method of demonstration | Characterization | Quality criterion | 1 | 2 | 3R | 4R | 5 | 6 | 7R |
|---|---|---|---|---|---|---|---|---|---|---|
| Others |  |  |  |  |  |  |  |  |  |  |
| mechanical properties: |  | tensile test |  |  |  |  |  |  |  |  |
| modulus (MPa) | according to specification |  |  | 190 | 170 | 180 | 100 | 90 | 20 | 22 |
| stress at break (MPa) |  |  | >15 | 20 | 32 | 28 | 12.5 | 21.3 | 19 | 18 |
| elongation at break (%) |  |  | >400 | 623 | 900 | 1000 | 361 | 680 | 770 | 950 |
| fire resistance (mm/min) | MVSS702 (rate of propagation) |  | <100 | 92 | 93 | 123 | 89 | 87 | 95 | 128 |
| high-frequency weldability |  | tensile test on weld | >$\sigma_R/2$ | good | good | good | no | good | good | good |

We claim:

1. A composition based on propylene polymer, ethylene-vinyl acetate copolymer and organic peroxide, including, by weight:
   (a) 10 to 49% of at least one propylene polymer;
   (b) 90 to 51% of at least one ethylene-vinyl acetate copolymer in which the vinyl acetate content is at least 12 and not more than 40% by weight;
   (c) more than 50 ppm (parts per million) and less than 1000 ppm of at least one organic peroxide, wherein the melt indices $MFI_a$ and $MFI_b$ of the propylene polymer (a) (measurement conditions: 230° C.; 2.16 kg) and ethylene-vinyl acetate copolymer (b) (measurement conditions: 190° C.; 2.16 kg), expressed in g/10 min, correspond to the relationship $$\frac{MFI_a \times W_a}{MFI_b \times W_b} < 1$$

in which $W_a$ and $W_b$ denote the respective weight proportions of the constituents a and b, provided that $MFI_a$ is less than 4 g/10 min and $MFI_b$ is more than 0.5 and less than 9 g/10 min.

2. The composition according to claim 1, wherein the ethylene-vinyl acetate copolymer (b) has an $MFI_b$ (190° C.; 2.16 kg) value higher than 1.5 g/10 min.

3. The composition according to claim 1, wherein the decomposition temperature of the constituent c is higher than the melting temperature of the constituent b.

4. The composition according to claim 1, wherein the organic peroxide is chosen from 2,5-dimethyl-2,5-di(tert-butylperoxy) hexane (DHBP), dicumyl peroxide (DCUP), tert-butyl cumyl peroxide (BCUP), di-tert-butyl peroxide (DTBP), 2,5-dimethyl-2,5-di(tert-butylperoxy)-3-hexyne (DYBP) and 1,3-di(2-tert-butylperoxyixopropyl)benzene (DIPP).

5. The composition according to claim 1, wherein the constituent c is present in the form of a master mixture consisting of this constituent and of a compatible carrier, this carrier representing not more than 5% of the total weight of the components a and b.

6. The composition according to claim 5, wherein the carrier consists essentially of polyethylene.

7. A process for converting a composition according to claim 1, including a stage of reactive extrusion of the composition.

8. The process according to claim 7, wherein the reactive extrusion is performed in an extruder fitted with a slot die.

9. The process according to claim 7, wherein the constituents of the composition are converted without preliminary mixing of these constituents.

10. The process according to claim 7, wherein after its extrusion, the sheet obtained is grained, colaminated or lacquered in line.

11. A high-frequency weldable sheet obtained from a composition according to claim 1.

12. A product obtained by processing the composition according to claim 1.

13. The product according to claim 12, wherein said process comprises a stage of reactive extrusion.

14. The composition according to claim 1, wherein said at least one propylene polymer is propylene homopolymer.

15. The composition according to claim 1, wherein the at least one organic peroxide (c) is present in an amount of more than 50 ppm and less than 200 ppm.

16. The composition according to claim 1, comprising by weight, 10 to 49 0 of at least one propylene polymer and 90 to 51% of at least one ethylene-vinyl acetate copolymer in which the vinyl acetate content is at least 12 and not more than 40% by weight, characterized by a $\mu_{0.25}/\mu_{100}$ (these parameters denoting the shear viscosity measured using a rheogoniometer, at 170° C., at 0.25 s$^{-1}$ and 100 s$^{-1}$ respectively) ratio higher than 25 and by a $\mu_{maxF}/\mu_{0.2s}$ (these parameters denoting, respectively, the elongational viscosity at which the tensile force exerted on the sample is at a maximum, and that measured after 0.2 g of pulling, both at 170° C.) ratio higher than 5.

17. The composition according to claim 1, comprising, by weight, from 20 to 40% of said at least one propylene polymer, and from 60 to 80% of said at least one ethylene-vinyl acetate copolymer in which the vinyl acetate content is from 18 to 32%.

18. A composition based on propylene polymer, ethylene-vinyl acetate copolymer and organic peroxide, including, by weight:
   (a) 10 to 49% of at least one propylene polymer;
   (b) 90 to 51% of at least one ethylene-vinyl acetate copolymer in which the vinyl acetate content is at least 12 and not more than 40% by weight;
   (c) more than 50 ppm (parts per million) and less than 1000 ppm of at least one organic peroxide, wherein the melt indices $MFI_a$ and $MFI_b$ of the propylene polymer (a) (measurement conditions: 230° C.; 2.16 kg) and ethylene-vinyl acetate copolymer (b) (measurement conditions: 190° C.; 2.16 kg), expressed in g/10 min, correspond to the relationship $$\frac{MFI_a \times W_a}{MFI_b \times W_b} < 0.7$$

in which $W_a$ and $W_b$ denote the respective weight proportions of the constituents a and b, provided that $MFI_a$ is less than 4 g/10 min and $MFI_b$ is more than 0.5 and less than 9 g/10 min.

19. The composition according to claim 18, wherein said melt indices correspond to the relationship $$\frac{MFI_a \times W_a}{MFI_b \times W_b} < 0.3.$$

* * * * *